(12) United States Patent
Li et al.

(10) Patent No.: US 11,265,507 B2
(45) Date of Patent: Mar. 1, 2022

(54) TERMINAL DEVICE AND METHOD FOR OUTPUTTING AUDIO

(71) Applicant: Beijing Xiaomi Mobile Software Co., Ltd., Beijing (CN)

(72) Inventors: Xiaoshuang Li, Beijing (CN); Shiwei Lu, Beijing (CN); Zhengrong Lv, Beijing (CN); Zhaoqian Xu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 26 days.

(21) Appl. No.: 16/818,579

(22) Filed: Mar. 13, 2020

(65) Prior Publication Data
US 2021/0152774 A1    May 20, 2021

(30) Foreign Application Priority Data
Nov. 15, 2019  (CN) .......................... 201911120256.5

(51) Int. Cl.
*H04R 1/02* (2006.01)
*H04N 5/64* (2006.01)
*H04R 1/28* (2006.01)

(52) U.S. Cl.
CPC ........... *H04N 5/642* (2013.01); *H04R 1/2803* (2013.01); *H04R 1/2892* (2013.01)

(58) Field of Classification Search
CPC ............... H04R 1/24; H04R 2201/025; H04R 2499/15; H04N 5/642
See application file for complete search history.

(56) References Cited

U.S. PATENT DOCUMENTS

| | | | | |
|---|---|---|---|---|
| 2,789,158 A | * | 4/1957 | Livingston | H04N 5/642 348/836 |
| 4,646,349 A | * | 2/1987 | Puls | H04N 5/642 181/153 |
| 5,321,760 A | * | 6/1994 | Gray | B60R 11/0217 181/150 |

(Continued)

FOREIGN PATENT DOCUMENTS

| | | |
|---|---|---|
| CN | 103179487 A | 6/2013 |
| CN | 203618076 U | 5/2014 |

(Continued)

OTHER PUBLICATIONS

Extended European Search Report in European Application No. 20165914.1, dated Jul. 7, 2020.

(Continued)

*Primary Examiner* — Ryan Robinson
(74) *Attorney, Agent, or Firm* — Finnegan, Henderson, Farabow, Garrett & Dunner, L.L.P.

(57) ABSTRACT

A terminal device includes: a housing; an audio output module; and a driving module, connected to the audio output module to drive the audio output module to move between a first position and a second position. The first position is located inside the housing, and the second position is located outside the housing. When the audio output module is in an audio output state, the audio output module is driven to move to the second position. When the audio output module exits the audio output state, the audio output module is driven to move to the first position.

18 Claims, 11 Drawing Sheets

(56) References Cited

U.S. PATENT DOCUMENTS

| | | | | |
|---|---|---|---|---|
| 6,343,135 | B1* | 1/2002 | Ellero | H04R 1/025 |
| | | | | 181/199 |
| 6,794,798 | B2* | 9/2004 | Watanabe | H04R 5/02 |
| | | | | 310/334 |
| 6,997,525 | B2* | 2/2006 | Gillengerten | A47B 81/06 |
| | | | | 312/21 |
| 7,702,123 | B2* | 4/2010 | Soerensen | H04R 1/026 |
| | | | | 381/389 |
| 8,014,554 | B2* | 9/2011 | Xu | H04R 1/345 |
| | | | | 381/386 |
| 8,150,093 | B2 | 4/2012 | Ueno | |
| 8,369,561 | B2* | 2/2013 | Bhutani | H04R 5/02 |
| | | | | 381/395 |
| 8,582,797 | B2* | 11/2013 | Wang | H04R 5/04 |
| | | | | 381/386 |
| 9,084,044 | B2* | 7/2015 | Chen | H04R 1/345 |
| 2002/0172518 | A1* | 11/2002 | Watson | F16M 11/18 |
| | | | | 396/428 |
| 2006/0062414 | A1* | 3/2006 | Yeh | H04R 1/026 |
| | | | | 381/333 |
| 2007/0274547 | A1 | 11/2007 | Ueno | |
| 2018/0367898 | A1* | 12/2018 | Alrawi | H04R 3/12 |
| 2020/0322714 | A1* | 10/2020 | Alva | G06F 1/1656 |

FOREIGN PATENT DOCUMENTS

| | | | |
|---|---|---|---|
| CN | 206061037 U | 3/2017 | |
| CN | 109448607 A | 3/2019 | |
| CN | 110753197 A | 2/2020 | |
| DE | 8700002 U1 | 3/1987 | |
| DE | 19534400 A1 * | 3/1997 | ......... B60R 11/0217 |
| DE | 29721578 U1 * | 2/1998 | ........... G06F 1/1605 |
| DE | 29721578 U1 | 2/1998 | |
| JP | 2008-153716 A | 7/2008 | |
| KR | 20090075152 A | 7/2009 | |
| KR | 20100004541 A | 1/2010 | |
| KR | 10-1644801 B1 | 8/2016 | |

OTHER PUBLICATIONS

Notification of Reason for Refusal dated Oct. 27, 2021, from the Korean Intellectual Property Office issued in counterpart Korean Application No. 10-2020-7007622.

* cited by examiner

TERMINAL DEVICE AND METHOD FOR OUTPUTTING AUDIO

CROSS-REFERENCE TO RELATED APPLICATIONS

This application is based upon and claims priority to Chinese Patent Application No. CN201911120256.5, filed on Nov. 15, 2019, the entire content of which is incorporated herein by reference.

TECHNICAL FIELD

The disclosure relates to the technical field of audio technologies, and more particularly, to a terminal device and a method for outputting audio.

BACKGROUND

With the continuous development of terminal devices and the advancement of science and technology, terminal devices are developing in the direction of intelligence and functional diversification. The design of functional modules in existing terminal devices may not meet user needs. For example, in conventional televisions, speakers are fixedly arranged in housings and may not meet user needs.

SUMMARY

The disclosure provides a terminal device and a method for outputting audio.

According to a first aspect of embodiments of the disclosure, a terminal device may include: a housing; an audio output module; and a driving module, connected to the audio output module to drive the audio output module to move between a first position and a second position, the first position being located inside the housing, and the second position being located outside the housing. When the audio output module is in an audio output state, the audio output module may be driven to move to the second position. When the audio output module exits the audio output state, the audio output module may be driven to move to the first position.

According to a second aspect of the embodiments of the disclosure, a method for outputting audio may include: detecting an audio output state of an audio output module of a terminal device; when the audio output module is in the audio output state, driving, by a driving module, the audio output module to move from a first position inside a housing of the terminal device to a second position outside the housing; outputting, by the audio output module in the second position, an audio signal outwards; and when the audio output module exits the audio output state, driving, by the driving module, the audio output module to move from the second position to the first position.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
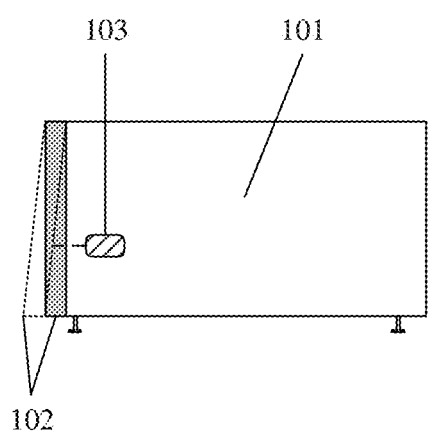
FIG. 1 is a schematic diagram illustrating a terminal device, according to some embodiments of the disclosure.

FIG. 1 is a schematic diagram illustrating a terminal device, according to some embodiments of the disclosure. As illustrated in FIG. 1, the terminal device includes: a housing 101; an audio output module 102 and a driving module 103, connected to the audio output module 102 to drive the audio output module 102 to move between a first position and a second position. The first position is located inside the housing 101, and the second position is located outside the housing 101.

In an embodiment, when the audio output module 102 is in an audio output state, the audio output module 102 is driven to move to the second position.

In an embodiment, when the audio output module 102 exits the audio output state, the audio output module 102 is driven to move to the first position.

In the embodiments of the disclosure, the terminal device includes, but is not limited to, a mobile device and a fixed device. The mobile device includes, but is not limited to, a laptop or a tablet computer. The fixed device includes, but is not limited to, a television or a desktop computer.

The shape of the housing may be set according to user requirements. For example, when the terminal device is a television, the shape of the housing may be set to be rectangular, which is not limited in the embodiments of the disclosure.

The audio output module 102 is configured to output an audio signal, so that a user can hear sounds such as music or conversations of characters in videos. The audio output module 102 is connected to the driving module 103, and can move between the first position and the second position.

The movement between the first position and the second position includes: movement from the first position to the second position or movement from the second position to the first position. For example, when an audio signal needs to the output, the audio output module 102 may be driven to move front the inside of the housing 101 to the outside of the housing 101, that is, move from the first position to the second position. When no audio needs to be output, the audio output module 102 may be driven to move from the outside of the housing 101 to the inside of the housing 101, that is, move from the second position to the first position.

In some embodiments, the audio output module 102 moving between the first position and the second position includes that the audio output module 102 moves between the first position and the second position through rotation and/or translation. When the audio output module 102 moves between the first position and the second position through rotation, a movement trajectory of the audio output module is a curve. When the audio output module 102 moves between the first position and the second position through translation, a movement trajectory of the audio output module is a straight line.

Figure 2:
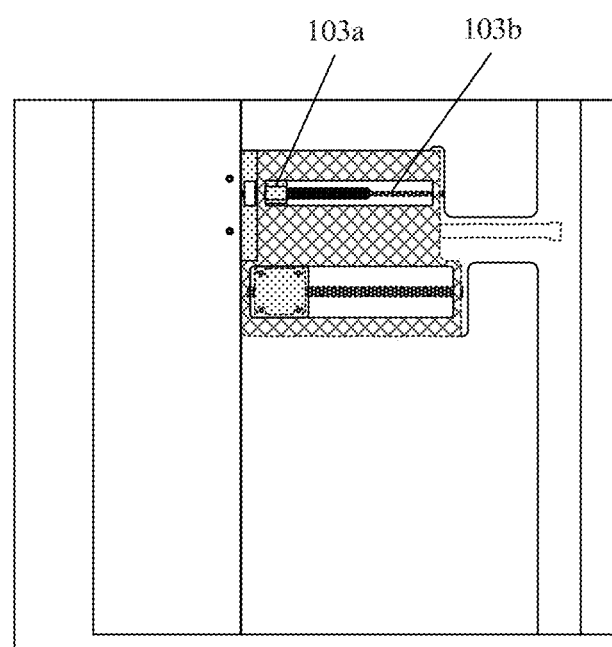
FIG. 2 is a schematic diagram illustrating a driving module of a terminal device, according to some embodiments of the disclosure.

FIG. 2 is a schematic diagram illustrating a driving module of a terminal device, according to some embodiments of the disclosure. As illustrated in FIG. 2, the driving module includes: a motor 103a; and a rotating component 103b connected to the motor 103a. The rotating component 103b rotates around the axis of a rotary shaft under the action of the motor 103a, and drives the rotating body to move between the first position and the second position.

The motor 103a can generate rotating forces in opposite directions. The motor 103a includes, but is not limited to, a synchronous motor or an asynchronous motor.

The rotating component 103b includes a rotating rod. Under the action of the rotating force generated by the motor 103a, the rotating component 103b can rotate around the axis in opposite directions, thereby driving the audio output module to move between the first position and the second position. For example, when the rotating component 103b rotates toward a first direction, the audio output module 102 is driven to move from the first position to the second position. When the rotating component 103b rotates toward a second direction, the audio output module 102 is driven to move from the second position to the first position. The first direction is opposite to the second direction.

In the embodiments of the disclosure, when the audio output module 102 is in an audio output state, the audio output module 102 can move from the inside of the housing 101 to the outside of the housing 101, and outputs an audio signal. When the audio output module 102 exits the audio output state, the audio output module 102 can move from the outside of the housing 101 to the inside of the housing 101, and does not output an audio signal.

The audio output state indicates that the audio output module 102 needs to output the audio signal. The audio output module 102 exits the audio output state, which indicates that the audio output module 102 does not currently need to output the audio signal. At this time, the terminal device may perform operations that do not require sound output on a screen of the terminal device, such as browsing information on the terminal device or writing information on the terminal device, which is not limited in the embodiments of the disclosure.

In an embodiment, whether the audio output module 102 is in the audio output state may be determined by an on/off state of the terminal device. For example, when the terminal device is a television, if the television is turned on, it may indicate that the audio output module 102 needs to output the audio signal, and then it may be determined that the audio output module 102 is in the audio output state. If the television is turned off, it may indicate that the audio output module 102 does not need to output the audio signal, and then it may be determined that the audio output module 102 has exited the audio output state.

In an embodiment, a detection module may also detect whether the audio output module 102 is in the audio output state, which is not limited in the embodiments of the disclosure. The detection module includes, but is not limited to, a sound sensor.

A television is taken as an example of the terminal device. If the television is turned on but a user currently adjusts the volume to zero, it also indicates that the audio output module 102 is not in the audio output state currently.

Figure 3:
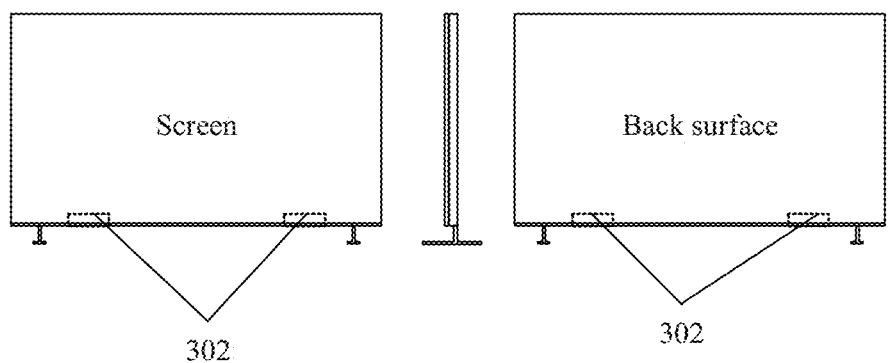
FIG. 3 is a schematic diagram illustrating a conventional terminal device.

FIG. 3 is a schematic diagram illustrating a conventional terminal device. As illustrated in FIG. 3, the terminal device includes a screen. A surface where the screen is located in is a front surface of the terminal device, and a surface opposite the surface where the screen is located in is a back surface of the terminal device. In the conventional terminal device, an audio output module 302 is hidden in the housing, and the audio output module 302 is fixed in the housing.

Figure 4:
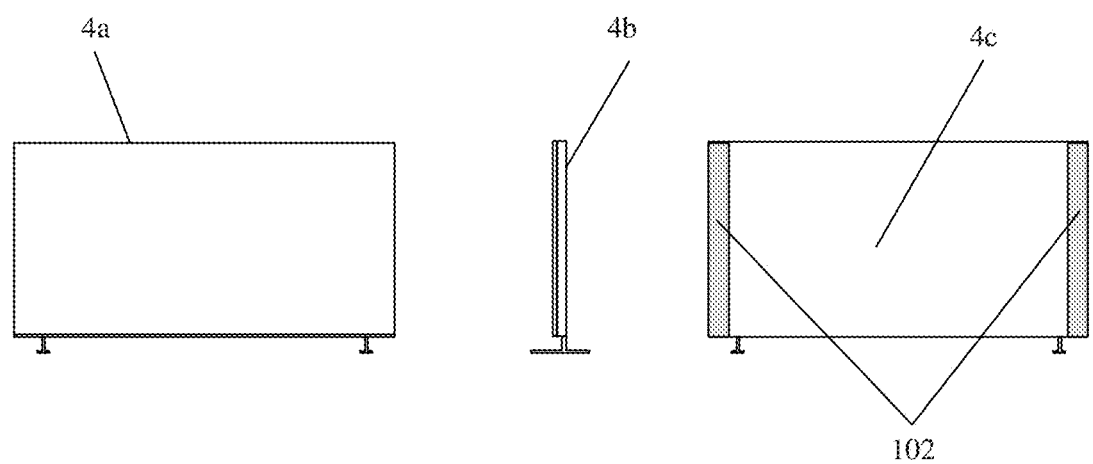
FIG. 4 is a schematic diagram illustrating a terminal device, according to some embodiments of the disclosure.

FIG. 4 is a schematic diagram illustrating a terminal device, according to some embodiments of the disclosure. As illustrated in FIG. 4, the terminal device includes a screen. A surface 4a where the screen is located in is a front surface of the terminal device, which corresponds to a front view of the terminal device. A surface 4c opposite the surface 4a where the screen is located in is a back surface of the terminal device, which corresponds to a back view of the terminal device. The terminal device also has a side 4b, which corresponds to a side view of the terminal device. As can be seen front the back view, and two audio output modules 102 are arranged in the terminal device. When the audio output module 102 exits the audio output state, the driving module 103 of the terminal device drives the audio output module 102 to move to the first position inside the housing 101. At this time, the audio output module 102 is hidden in the housing 101 and does not output the audio signal.

Figure 5:
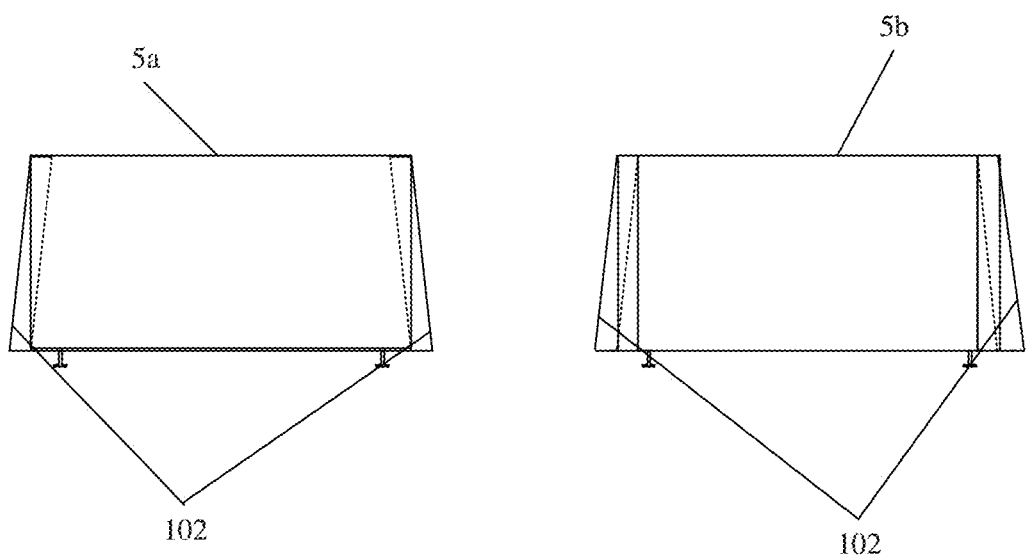
FIG. 5 is a schematic diagram illustrating a terminal device, according to some embodiments of the disclosure.

FIG. 5 is a schematic diagram illustrating a terminal device, according to some embodiments of the disclosure. As illustrated in FIG. 5, the terminal device includes a screen. A surface 5a where the screen is located in is a front surface of the terminal device, which corresponds to a front view of the terminal device. A surface 5b opposite the surface 5a where the screen is located in is a back surface of the terminal device, which corresponds to a back view of the terminal device. Two audio output modules 102 are arranged in the terminal device. As can be seen from the front view and the hack view, when the audio output module 102 is in the audio output state, the driving module 103 of the terminal device drives the audio output module 102 to move to the second position outside the housing, the two audio output modules 102 of the terminal device are exposed from two sides, and output the audio signal.

In this way, in the embodiments, only when an audio output module is in an audio output state, the audio output module is driven to move from the inside of a housing to the outside of the housing. Blockage of audio output can be reduced, thereby improving an audio output effect. Meanwhile, when no audio signal is output, the audio output module is contained in the housing, which can protect the audio output module to reduce the probability of damage to the terminal device from outside of the housing, and also reduce space occupied by the terminal device. Also, the audio output module can move between the inside of the housing and the outside of the housing, so that the design of the audio output module is more intelligent, and the user experience is improved.

Figure 6:
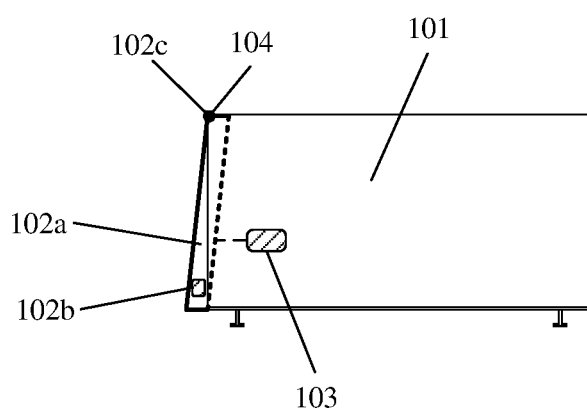
FIG. 6 is a schematic diagram illustrating a terminal device, according to some embodiments of the disclosure.

FIG. 6 is a schematic diagram illustrating a terminal device, according to some embodiments of the disclosure. As illustrated in FIG. 6, the terminal device further includes: a rotating rod 104, fixedly installed in the housing 101.

Referring to FIGS. 1 and 6, the audio output module 102 includes: a rotating body 102a and an audio output component 102b installed on the rotating body 102a.

The rotating body 102a is movably connected to the rotating rod 104.

The driving module 103 is connected to the rotating body 102a and configured to drive the rotating body 102a to rotate between the first position and the second position around the rotating rod 104.

In the embodiments of the disclosure, the rotating body 102a is movably connected to the rotating rod 104, and the rotating body 102a is movable relative to the housing 101. The driving module 103 can drive the rotating body 102a to rotate to the second position around the rotating rod 104 when the audio output module 102 is in the audio output state, and drive the rotating body 102a to rotate to the first position around the rotating rod 104 when the audio output module 102 exits the audio output state.

The operation that the rotating body 102a rotates around the rotating rod 104 includes: the rotating body 102a is provided with an annular structure 102c, and the rotating rod 104 passes through the annular structure 102c, so that the rotating body 102a is rotatable around the rotating rod 104.

The rotating body of the embodiments of the disclosure can rotate on the housing around the rotating rod. In this way, the rotating body can rotate between the first position and the second position, which makes the terminal device more intelligent.

In an embodiment, when the rotating body 102a rotates to the first position, the rotating body 102a is located inside the housing 101.

When the rotating body 102a rotates to the second position, a first region of the rotating body 102a is exposed outside the housing 101, and a second region of the rotating body 102a is located inside the housing 101.

The audio output component 102b is arranged in the first region, and the first region and the second region constitute an entire region of the rotating body 102a.

In the embodiments of the disclosure, when the audio output module exits the audio output state, the rotating body rotates to the first position, and the whole rotating body is located inside the housing. When the audio output module is in the audio output state, the rotating body rotates to the second position. At this time, the rotating body is not fully exposed outside the housing, but only the first region is exposed outside the housing, and the second region is hidden inside the housing. Moreover, the audio output component is arranged in the first region exposed outside the housing.

That is, when the audio signal is not required to be output, the rotating body may be rotated into the housing. When the audio signal is required to be output, only the first region of the audio output component which is arranged on the rotating body may be rotated to the outside of the housing. In this way, compared to rotating the whole rotating body outside the housing, a region where the rotating body is rotated outside the housing can be reduced, thereby reducing the floor space.

In an embodiment, the audio output component 102b includes: a first output sub-component, spaced apart from the rotating rod 104 by a first distance, and configured to output an audio signal lower than a frequency threshold; and a second output sub-component, spaced apart from the rotating rod 104 by a second distance, and configured to output an audio signal higher than the frequency threshold. The first distance is greater than the second distance.

The first output sub-component is configured to output an audio signal lower than a frequency threshold, and the second output sub-component is configured to output an audio signal higher than the frequency threshold. That is, comparing the first output sub-component to the second output sub-component, the first output sub-component is configured to output a bass portion of the audio signal, and the second output sub-component is configured to output a treble portion of the audio signal.

In an embodiment, the distance between the first output sub-component and the rotating rod is greater than the distance between the second output sub-component and the rotating rod, that is, the first output sub-component is arranged at an end away from the rotating rod, and the second output sub-component is arranged at an end close to the rotating rod.

In another embodiment, the audio output component 102b further includes: a third output sub-component, spaced apart from the rotating rod 104 by a third distance; and a fourth output sub-component, spaced apart from the rotating rod 104 by a fourth distance. A size of the third output sub-component is greater than a size of the fourth output sub-component, a maximum output volume of the third output sub-component is greater than a maximum output volume of the fourth output sub-component, and the third distance is greater than the fourth distance.

In the embodiments, the region of the rotating body exposed outside the housing increases as the distance from the rotating rod increases. The size of the third output sub-component is greater than the size of the fourth output sub-component. Therefore, when the third output sub-component and the fourth output sub-component are arranged on the rotating body, the third output sub-component may be arranged at an end away from the rotating rod, and the fourth output sub-component may be arranged at an end close to the rotating rod.

Figure 7:
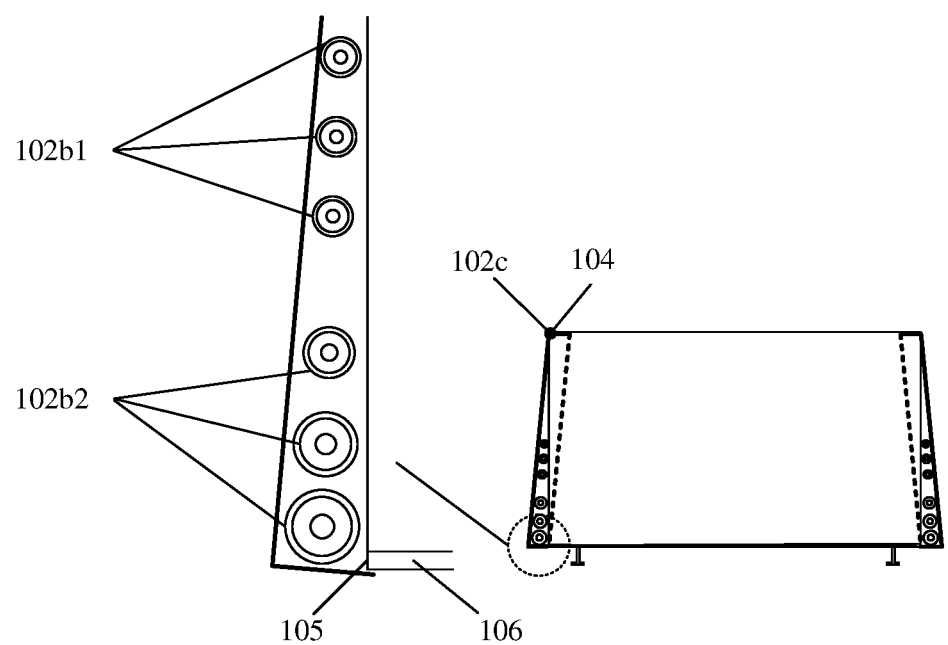
FIG. 7 is a schematic diagram illustrating a terminal device, according to some embodiments of the disclosure.

FIG. 7 is a schematic diagram illustrating a terminal device, according to some embodiments of the disclosure. As illustrated in FIG. 7, the rotating rod 104 is arranged at the top of the rotating body. From the top of the rotating body to the bottom of the rotating body, the sizes of the output sub-components of the audio output component are ascending. Therefore, when a third output sub-component 102b2 and a fourth output sub-component 102b1 are arranged, a third distance between the third output sub-component 102b2 and the rotating rod 104 is greater than a fourth distance between the fourth output sub-component 102b1 and the rotating rod 104.

In art embodiment, the housing includes a first surface, the first surface including a first end and a second end arranged to be opposite the first end.

When the rotating rod is arranged at the first end, the rotating body rotates around the rotating rod such that the first region starts to be exposed from an arrangement direction of the second end.

When the rotating rod is arranged at the second end, the rotating body rotates around the rotating rod such that the first region starts to the exposed from an arrangement direction of the first end.

In the embodiments, when the audio output module is in the audio output state, during the rotation of the rotating body around the rotating rod, the first region of the rotating body starts to be exposed until the first region is fully exposed outside the housing.

The rotating rod may be arranged at a first end of the first surface of the housing or a second end arranged to be opposite the first end. When the rotating rod is arranged at the first end, the first region of the rotating body is exposed from the arrangement direction of the second end. When the rotating rod is arranged at the second end, the first region of the rotating body is exposed front the arrangement direction of the first end. That is, the arrangement direction of the rotating rod is opposite to the direction in which the rotating body starts to be exposed.

As illustrated in FIG. 6, the rotating rod 104 is arranged at the first end, the first region of the rotating body starts to be exposed from the arrangement direction of the second end.

Figure 8:
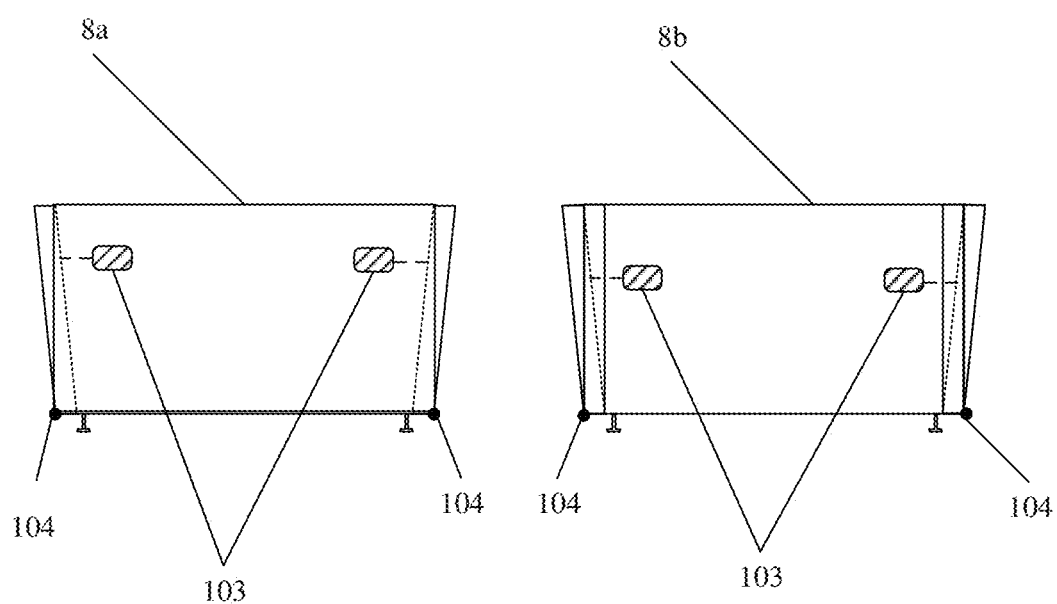
FIG. 8 is a schematic diagram illustrating a terminal device, according to some embodiments of the disclosure.

FIG. 8 is a schematic diagram illustrating a terminal device, according to some embodiments of the disclosure. As illustrated in FIG. 8, the terminal device includes a screen. A surface 8a where the screen is located in is a front side of the terminal device, which corresponds to a front view of the terminal device. A surface 8b opposite the surface 8a where the screen is located in is a back surface of the terminal device, which corresponds to a back view of the terminal device. The first surface is one of the four surfaces adjacent to the surface 8a where the screen is located in, the rotating rod 104 is arranged at a second end of the first surface, and the driving module 103 drives the rotating body to rotate, so that the first region of the rotating body starts to be exposed from the arrangement direction of the first end of the first surface.

Figure 9:
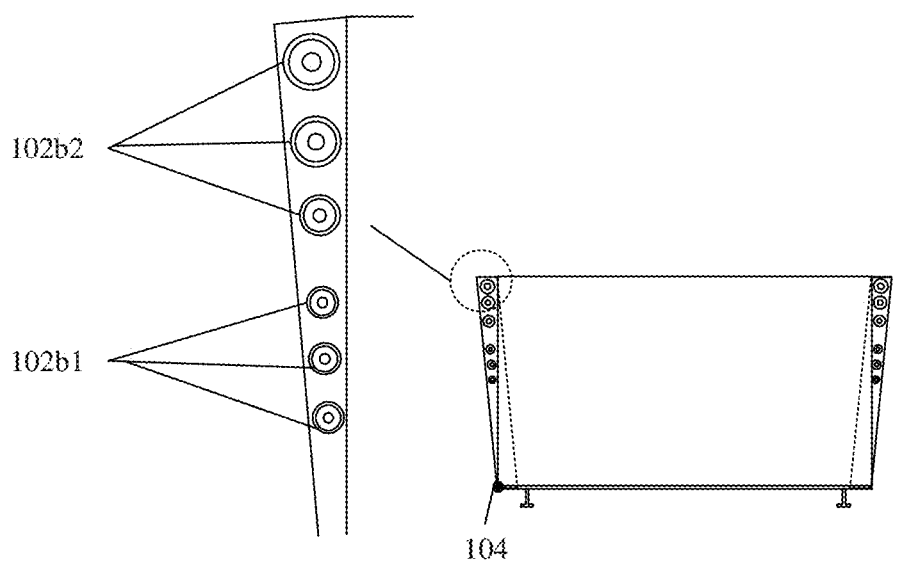
FIG. 9 is a schematic diagram illustrating a terminal device, according to some embodiments of the disclosure.

FIG. 9 is a schematic diagram illustrating a terminal device, according to some embodiments of the disclosure. As illustrated in FIG. 9, the third output sub-component 102b2 is arranged at an end away from the rotating rod 104, and the fourth output sub-component 102b1 is arranged at an end close to the rotating rod 104. That is, the distance between the fourth output sub-component 102b1 and the rotating rod 104 is smaller than the distance between the third output sub-component 102b2 and the rotating rod 104.

In an embodiment, the housing further includes a second surface adjacent to the first surface. The terminal device further includes: a screen arranged on the second surface. There are two audio output modules, and the two audio output modules are arranged on both sides of the screen respectively.

In the embodiments, the terminal device includes a screen, and there are two audio output modules, and the two audio output modules are arranged on both sides of the screen respectively.

As illustrated in FIG. 4, the audio output modules 102 are arranged on two sides of the screen. When the audio output modules 102 are in an audio output state, the audio output modules are exposed front two sides of the screen. In this way, compared with providing one audio output module, two audio output modules provided on two sides of the screen respectively can superpose audio signals generated by the terminal device, thereby improving an audio signal output effect.

In an embodiment, the terminal device further includes: a limiting module, located in the housing, movably connected to the audio output module, and configured to limit the audio output module to moving between the first position and the second position.

In the embodiment, when the driving module drives the audio output module to move, the limiting module limits the audio output module from continuing to move after moving to the first position, or limits the audio output module front continuing to move after moving to the second position. In this way, by providing the limiting module, the movement position of the audio output module can be more accurate.

In an embodiment, the limiting module includes: an arc-shaped limiting groove 106, arranged in the housing; and a connecting rod 105, having a first end and a second end. The first end is located in the arc-shaped limiting groove 106 and movable in the arc-shaped limiting groove 106, and the second end is connected to the audio output module.

When the first end is located at a third position in the arc-shaped limiting groove 106, the audio output module moves to the first position.

When the first end is located at a fourth position in the arc-shaped limiting groove 106, the audio output module moves to the second position. A distance between the fourth position and a center point of the terminal device is greater than a distance between the third position and the center point of the terminal device.

The first end of the connecting rod 105 is movable in the arc-shaped limiting groove 106, and the second end of the connecting rod 105 is connected to the audio output module. When the driving module drives the audio output module to move between the first position and the second position, the connecting rod 105 is driven to move, and then the first end of the connecting rod 105 is driven to move between the third position and the fourth position in the arc-shaped limiting groove 106.

When the audio output module moves to the first position, the first end moves to the third position in the arc-shaped limiting groove 106. At this time, the first end may not continue to move in the arc-shaped limiting groove 106, which can limit the audio output module from continuing to move. When the audio output module moves to the second position, the first end moves to the fourth position in the arc-shaped limiting groove 106. At this time, the second end may not continue to move in the arc-shaped limiting groove 106, which can limit the audio output module from continuing to move. In this way, the audio output module can be limited to moving between the first position and the second position.

Figure 10:
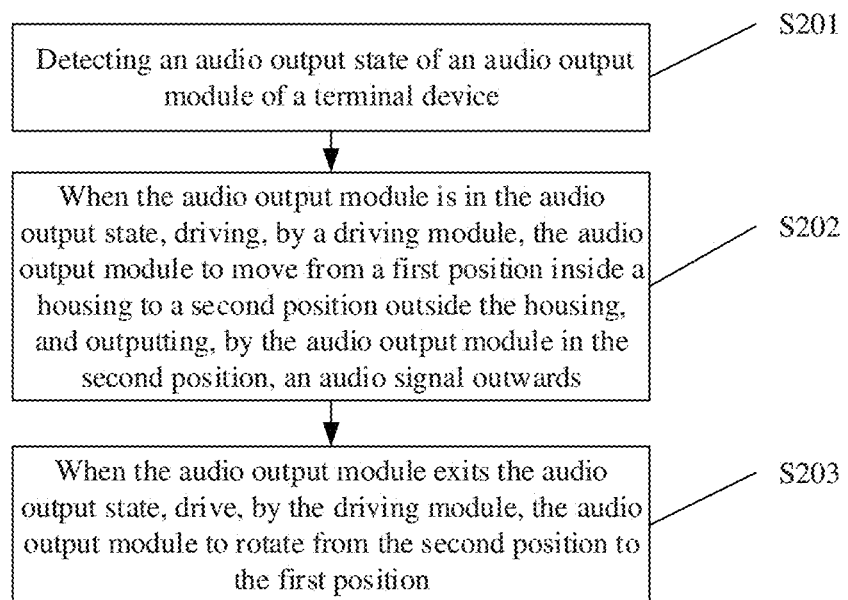
FIG. 10 is a flowchart illustrating a method for outputting audio, according to some embodiments of the disclosure.

FIG. 10 is a flowchart illustrating a method for outputting audio, according to some embodiments of the disclosure. As illustrated in FIG. 10, the method includes the following steps.

In S201, an audio output state of an audio output module of a terminal device is detected.

In S202, when the audio output module is in the audio output state, a driving module drives the audio output module to move from a first position inside a housing of the terminal device to a second position outside the housing, and the audio output module in the second position outputs an audio signal outwards.

In S203, when the audio output module exits the audio output state, the driving module drives the audio output module to move from the second position to the first position.

In the embodiment, only when an audio output module is in an audio output state, the audio output module is driven to move from the inside of a housing to the outside of the housing. In this way, as compared with hiding the audio output module in the housing, the disclosure adjusts the position of the audio output module according to the audio output state of the audio output module, so that when an audio signal is output, the audio output module is exposed outside the housing, which can reduce blockage of audio output, thereby improving an audio output effect. Meanwhile, when no audio signal is output, the audio output module is contained in the housing, which can protect the audio output module to reduce the probability of damage to the terminal device from outside of the housing, and also reduce space occupied by the terminal device. Also, the audio output module can move between the inside of the housing and the outside of the housing, so that the design of the audio output module is more intelligent, and the user experience is improved.

In an embodiment, the operation that a driving module drives the audio output module to move from a first position inside a housing of the terminal device to a second position outside the housing includes that: the driving module drives a rotating body of the audio output module such that the rotating body rotates, around a rotating rod fixedly installed in the housing, from the first position inside the housing to the second position outside the housing.

In an embodiment, the operation that the driving module drives the audio output module to move from the second position to the first position includes that: the driving module drives a rotating body of the audio output module such that the rotating body rotates, around a rotating rod fixedly installed in the housing, from the second position to the first position.

The technical solutions provided by the embodiments of the disclosure may include the following beneficial effects.

In the embodiments, when an audio output module is in an audio output state, the audio output module is driven to move from the inside of a housing of the terminal device to the outside of the housing. In this way, as compared with hiding the audio output module in the housing, the disclosure adjusts the position of the audio output module according to the audio output state of the audio output module, so that when an audio signal is output, the audio output module is exposed outside the housing, which can reduce blockage of audio output, thereby improving an audio output effect. Meanwhile, when no audio signal is output, the audio output module is contained in the housing, which can protect the audio output module to reduce the probability of damage to the terminal device from outside of the housing, and also reduce space occupied by the terminal device. Also, the audio output module can move between the inside of the housing and the outside of the housing, so that the design of the audio output module is more intelligent, and the user experience is improved.

It is to be noted that the terms "first," "second," "third," and "fourth" used in describing the embodiments are merely for convenience of expression and differentiation, and are meant to be limiting.

It is to be noted that "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art.

Figure 11:
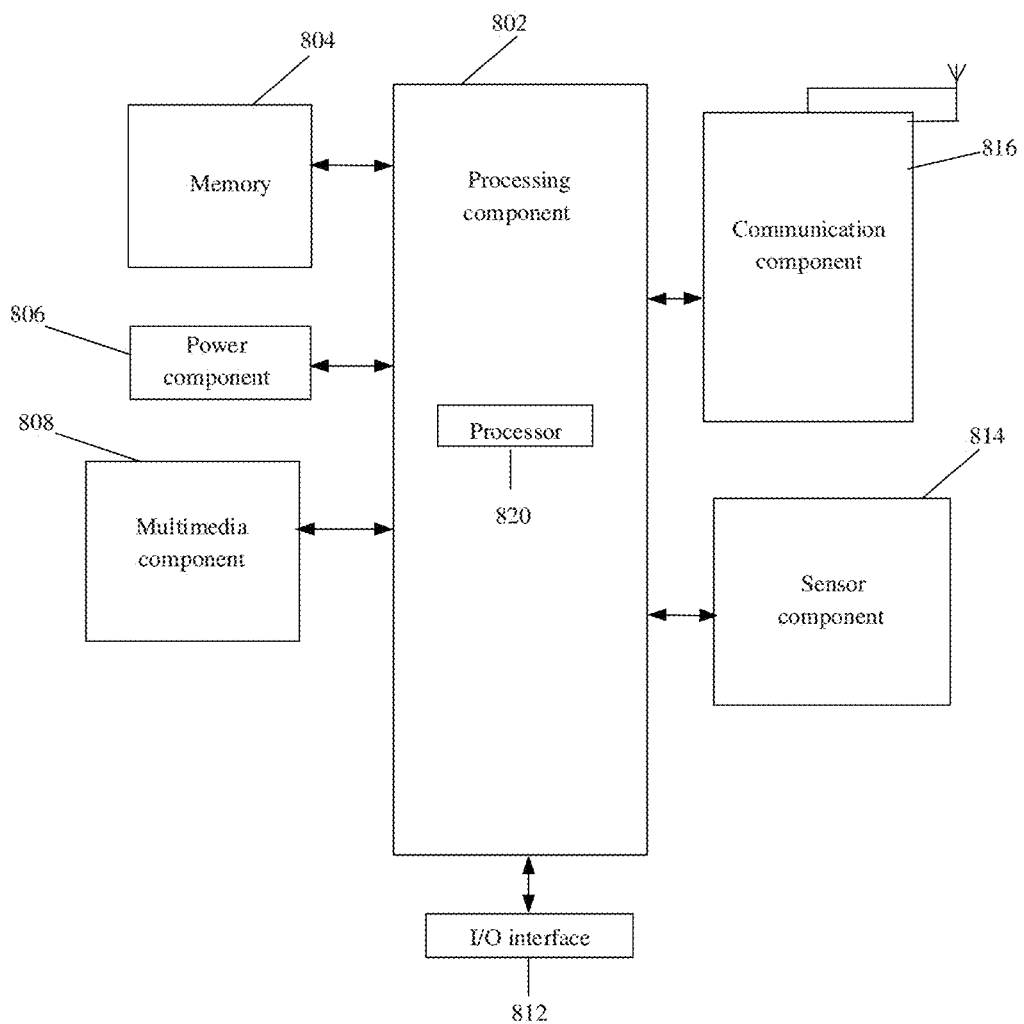
FIG. 11 is a block diagram illustrating a terminal device, according to some embodiments of the disclosure.

FIG. 11 is a block diagram illustrating a terminal device, according to some embodiments of the disclosure. For example, the terminal device may be a mobile phone, a computer, a digital broadcast terminal, a messaging device, a gaming console, a tablet, a medical device, exercise equipment, a personal digital assistant, and the like.

Referring to FIG. 11, the terminal device may include one or more of the following components: a processing component 802, a memory 804, a power component 806, a multimedia component 808, an Input/Output (I/O) interface 812, a sensor component 814, and a communication component 816.

The processing component 802 typically controls overall operations of the terminal device, such as operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the terminal device. Examples of such data include instructions for any applications or methods operated on the terminal device, contact data, phonebook data, messages, pictures, video, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the terminal device. The power component 806 may include a power management system, one or more power sources, and any other components associated with the generation, management and distribution of power in the terminal device.

The multimedia component 808 includes a screen providing an output interface between the terminal device and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the terminal device is in an operation mode, such as a photographing mode or a video mode. Each of the front camera and the rear camera may be a fixed optical lens system or have focus and optical zoom capability.

The I/O interface 812 provides an interface between the processing component 802 and peripheral interface modules, such as a keyboard, a click wheel, or buttons. The buttons may include, but are not limited to, a home button, a volume button, a starting button, and a locking button.

The sensor component 814 includes one or more sensors to provide status assessments of various aspects of the terminal device. For example, the sensor component 814 may detect an open/closed status of the terminal device, and relative positioning of components. For example, the component is the display and the keypad of the terminal device. The sensor component 814 may also detect a change in position of the terminal device or a component of the terminal device, a presence or absence of user contact with the terminal device, an orientation or an acceleration/deceleration of the terminal device, and a change in temperature of the terminal device. The sensor component 814 may include a proximity sensor configured to detect the presence of nearby objects without any physical contact. The sensor component 814 may also include a light sensor, such as a Complementary Metal Oxide Semiconductor (CMOS) or Charge Coupled Device (CCD) image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate communication, wired or wirelessly, between the terminal device and other devices. The terminal device may access a wireless network based on a communication standard, such as WiFi, 4G or 5G, or a combination thereof. In one exemplary embodiment, the communication component 816 receives a broadcast signal or broadcast associated information from an external broadcast management system via a broadcast channel. In one exemplary embodiment, the communication component 816 further includes a Near Field Communication (NFC) module to facilitate short-range communications. For example, the NEC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the terminal device may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures front the disclosure as come within known or customary practice in the art. It is intended that the embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A terminal device, comprising:
a housing;
an audio output module;
a driving module, connected to the audio output module and configured to drive the audio output module to move between a first position and a second position, the first position being located inside the housing, and the second position being located outside the housing; and
a limiting module, located in the housing, movably connected to the audio output module, and configured to limit the audio output module to moving between the first position and the second position,
wherein when the audio output module is in an audio output state, the audio output module is driven to move to the second position,
when the audio output module exits the audio output state, the audio output module is driven to move to the first position,
the limiting module comprises: an arc-shaped limiting groove, arranged in the housing; and a connecting rod, having a first end and a second end, wherein the first end is located in the arc-shaped limiting groove and moveable in the arc-shaped limiting groove, and the second end is connected to the audio output module,
when the first end is located at a third position in the arc-shaped limiting groove, the audio output module moves to the first position, and
when the first end is located at a fourth position in the arc-shaped limiting groove, the audio output module moves to the second position, wherein a distance between the fourth position and a center point of the terminal device is greater than a distance between the third position and the center point of the terminal device.

2. The terminal device of claim 1, further comprising:
a rotating rod, fixedly installed in the housing,
wherein the audio output module comprises a rotating body and an audio output component installed on the rotating body;
the rotating body is movably connected to the rotating rod; and
the driving module is connected to the rotating body and configured to drive the rotating body to rotate between the first position and the second position around the rotating rod.

3. The terminal device of claim 2, wherein:
when the rotating body rotates to the first position, the rotating body is located inside the housing;
when the rotating body rotates to the second position, a first region of the rotating body is exposed outside the housing, and a second region of the rotating body is located inside the housing; and
the audio output component is arranged in the first region, and the first region and the second region constitute an entire region of the rotating body.

4. The terminal device of claim 3, wherein the audio output component comprises:
a first output sub-component, spaced apart from the rotating rod by a first distance, and configured to output an audio signal lower than a frequency threshold; and
a second output sub-component, spaced apart from the rotating rod by a second distance, and configured to output an audio signal higher than the frequency threshold,
wherein the first distance is greater than the second distance.

5. The terminal device of claim 3, wherein the audio output component further comprises:
a third output sub-component, spaced apart from the rotating rod by a third distance; and
a fourth output sub-component, spaced apart from the rotating rod by a fourth distance,
wherein a size of the third output sub-component is greater than a size of the fourth output sub-component, a maximum output volume of the third output sub-component is greater than a maximum output volume of the fourth output sub-component, and the third distance is greater than the fourth distance.

6. The terminal device of claim 3, wherein the housing comprises a first surface, and the first surface comprises a first end and a second end, the second end of the first surface being arranged to be opposite the first end of the first surface;
when the rotating rod is arranged at the first end of the first surface, the rotating body rotates around the rotating rod such that the first region starts to be exposed from an arrangement direction of the second end of the first surface;
when the rotating rod is arranged at the second end of the first surface, the rotating body rotates around the rotating rod such that the first region starts to be exposed from an arrangement direction of the first end of the first surface.

7. The terminal device of claim 6, wherein the housing further comprises: a second surface adjacent to the first surface;
the terminal device further comprises a screen arranged on the second surface; and
wherein there are two audio output modules, and the two audio output modules are arranged on two sides of the screen respectively.

8. The terminal device of claim 1, wherein the driving module is configured to drive the audio output module to move between the first position and the second position through rotation or translation.

9. The terminal device of claim 8, wherein when the audio output module moves between the first position and the second position through rotation, a movement trajectory of audio output module is a curve.

10. The terminal device of claim 8, wherein when the audio output module moves between the first position and the second position through translation, a movement trajectory of the audio output module is a straight line.

11. The terminal device of claim 2, wherein the driving module comprises:
a motor; and
a rotating component connected to the motor.

12. The terminal device of claim 11, wherein the rotating component is configured to rotate around an axis of a rotary shaft under an action of the motor, and to drive the rotating body to move between the first position and the second position.

13. The terminal device of claim 11, wherein the motor comprises at least one of a synchronous motor or an asynchronous motor.

14. The terminal device of claim 2, wherein the rotating body has an annular structure, and the rotating rod passes through the annular structure so that the rotating body rotates between the first position and the second position around the rotating rod.

15. A method for outputting audio, implemented by the terminal device according to claim 1, comprising:
detecting the audio output state of the audio output module of the terminal device;
when the audio output module is in the audio output state, driving, by the driving module, the audio output module to move from the first position inside the housing of the terminal device to the second position outside the housing; and
outputting, by the audio output module in the second position, an audio signal outwards; and
when the audio output module exits the audio output state, driving, by the driving module, the audio output module to move from the second position to the first position.

16. The method of claim 15, wherein the driving, by the driving module, the audio output module to move from the first position inside the housing of the terminal device to the second position outside the housing comprises:
driving, by the driving module, a rotating body of the audio output module such that the rotating body rotates, around a rotating rod fixedly installed in the housing, from the first position inside the housing to the second position outside the housing.

17. The method of claim 15, wherein driving, by the driving module, the audio output module to move from the second position to the first position comprises:
driving, by the driving module, a rotating body of the audio output module such that the rotating body rotates, around a rotating rod fixedly installed in the housing, from the second position to the first position.

18. The method of claim 15, wherein the driving, by the driving module, the audio output module to move from the first position inside the housing of the terminal device to the second position outside the housing comprises:
driving, by the driving module, the audio output module to move from the first position inside the housing to the second position outside the housing through rotation or translation.

* * * * *